United States Patent [19]

Senoo et al.

[11] Patent Number: 5,086,453
[45] Date of Patent: Feb. 4, 1992

[54] APPARATUS FOR COMMUNICATING DATA VIA A TELEPHONE

[75] Inventors: Seiiti Senoo, Nara; Tadamasa Maekawa, Yamatokouriyama, both of Japan

[73] Assignee: Sharp Kabushiki Kaisha, Osaka, Japan

[21] Appl. No.: 530,745

[22] Filed: May 30, 1990

[30] Foreign Application Priority Data

May 30, 1989 [JP] Japan .................................. 1-137740

[51] Int. Cl.⁵ .............................................. H04 11/00
[52] U.S. Cl. ......................................... 379/93; 379/98; 379/100
[58] Field of Search ........................ 379/93, 94, 96–98, 379/100; 358/400, 407, 405

[56] References Cited

U.S. PATENT DOCUMENTS 4,794,637 12/1988 Hashimoto ........................... 379/100
4,901,343 2/1990 Yamaguchi ........................... 379/100
4,974,253 11/1990 Hashimoto ........................... 379/100

FOREIGN PATENT DOCUMENTS 61-245766 11/1986 Japan .

Primary Examiner—James L. Dwyer
Assistant Examiner—Ahmed F. Matar

[57] ABSTRACT

A data communication apparatus includes a data communication portion adapted to be connected to the public telephone line in parallel to a telephone set for data transmission/reception with another station through line connection, a termination command generating device for generating a termination command to terminate data communication by the data communication portion under predetermined conditions, a detecting device for detecting a termination command and generating a detection signal, a delay circuit for delaying the detection signal by a predetermined time, and a line connection terminating device responsive to the delayed detection signal for terminating line connection. There is a predetermined time margin defined by the delay circuit, during the time the termination command is generated until the line connection is terminated. Accordingly, the operation to maintain line connection after the termination of data communication can be performed easily, and talking with the destination station by the telephone is available without re-establishing the line connection, for example.

8 Claims, 7 Drawing Sheets

APPARATUS FOR COMMUNICATING DATA VIA A TELEPHONE

BACKGROUND OF THE INVENTION

1. Field of the Invention

This invention relates generally to a data communication apparatus for data communication with other stations via a telephone. More particularly, it relates to a data communication apparatus that is capable of switching to talking by an attached telephone set.

2. Description of the Related Art

The recent remarkable spread of computers is greatly influencing our community. The essential advantage of the computer to process a large volume of data rapidly and precisely contributes greatly to this. However, one of the greatest significance of the computer in modern society lies in the application thereof to terminals in a communication network established all over the country or world.

At present, the public telephone line is one of the most simple and widely used communication networks. The computer can function as a data communication apparatus that is actually capable of communication on a country wide basis.

FIG. 1 is a block diagram showing a configuration of the above-mentioned conventional data communication apparatus. FIG. 1 shows a structure including the computer within the data communication apparatus. In practice, a partial function of an existing computer is often utilized as the data communication apparatus.

There are some cases where not only computers but also word processors are employed as a data communication apparatus by incorporating a card-type modem and using a CPU (Central Processing Unit) as a control device.

Referring to FIG. 1, the data communication apparatus includes a line connection unit 16 connected to a public telephone line via terminals 12 and 14 for connecting and disconnecting the data communication apparatus with the public telephone line; a modem unit 18 connected to line connection unit 16 for data transmission/reception with another station and for the management of accompanying communication procedures by being line-connected to another station via line connection unit 16; and a computer 20 connected to modem unit 18 for managing data transmitted/received between another station and the overall communication. The public telephone line has an attached telephone set 22 provided in parallel with line connection unit 16.

The line connection unit 16 includes a line transformer 24 having the primary coil connected to modem unit 18 and the secondary coil connected to terminals 12 and 14 of the public telephone line contact to couple the circuits of the modem unit 18 side and the circuits of the public telephone line side by magnetic coupling for transmitting signals; a switch SW2 provided between line transformer 24 and terminal 12 to switch between a connected position and a disconnected position of the line transformer 24 and terminal 12 controlled by modem unit 18; a transmitter amplifier 28 having the input connected to modem unit 18 and the output connected to line transformer 24 for amplifying the signal from modem unit 18 to be transmitted; and a receiver amplifier 30 having the input connected to line transformer 24 and the output connected to modem unit 18 for amplifying the received signal from the public telephone line via line transformer 24 to be applied to modem unit 18.

The modem unit 18 includes a modem 32 connected to line connection unit 16 for modulating the data to be transmitted to an analog signal from a digital signal, and demodulating received data to a digital signal from an analog signal; a modem controller 34 connected between modem 32 and a computer 20 for monitoring the communication status while executing communication procedures with another station by modem 32, and exchanging data and communication information with computer 20 for detecting the termination of the communication or an accidental condition of the communication status to generate a termination command; and a relay circuit 36 operative in response to a termination command for disconnecting switch SW2. The relay circuit 36 includes a relay 38 having one end connected to the power potential Vc for operating switch SW2. It further includes a transistor 40 having the base connected to modem controller 34, the collector connected to the other end of relay 38, and the emitter connected to the ground potential, respectively.

The computer 20 includes a CPU 42 connected to modem controller 34 and other peripheral equipment via an shown interface (not shown) for executing a program that controls data transmission/reception; a keyboard 44 connected to CPU 42 for the operator to provide instructions to CPU 42 thereby; a display 46 connected to CPU 42 for displaying the message of CPU 42; a timer 48 connected to CPU 42 to be used by CPU 42 for managing its own operation and the operation of the peripheral equipments; a ROM (Read Only Memory) 50 connected to CPU 42 having information not requiring dynamic rewritting; a RAM (Random Access Memory) 52 for CPU 42 to use as a working storage; and a disk 54 wherein the data to be transmitted/received and the overall data including the program are written in. A flexible disk and the like may be used instead of disk 54.

The attached telephone set 22 is used to achieve line connection manually by the operator, as well as being utilized for talking. The attached telephone set 22 includes a switch SW1 which is turned on by the operator lifting the telephone handset, not shown (off hook).

Referring to FIG. 1, the operation of a conventional data communication apparatus will be described. There are two ways of line connection. The first connection method is a manual calling by the operator using the attached telephone set 22. The operator lifts the telephone handset of the attached telephone set 22. This turns switch SW1 on. The operator dials the telephone number of the destination station to establish line connection with the destination station. This manner is similar to that of a general telephone set.

The second connection method is to utilize the automatic dialing function of modem unit 18. The telephone number of the destination station is previously stored in modem controller 34. When modem controller 34 is instructed by the operator to establish line connection with a predetermined station, it will send current intermittently to the base of transistor 40 in accordance with the telephone number of the destination station. The intermittent conductance of transistor 40 will operate relay 38 to turn switch SW2 on/off intermittently. This causes information required for the connection with another station to be sent as dialing pulses to the exchange device of the public line for establishing line connection with the destination station through a predetermined procedure. The destination telephone number is not necessarily stored in modem controller 34. In another method, it is stored in computer 20, where modem controller 34 is instructed by computer 20.

In the case of manual line connection, the operator will operate the modem controller 34 to turn SW2 on after confirming the line connection. In the case of line connection by the modem, switch SW2 is turned on after the dialing pulses are sent. A program for the execution of data communication is previously loaded in RAM 52. CPU 42 will pass the data stored in disk 54 to modem unit 18, as well as receive data from modem unit 18 for writing the same into a file in disk 54, in accordance with the program for data communication. In this event, information regarding the communication status is exchanged between CPU 42 and modem unit 18, when necessary.

The modem controller 34 is provided to perform error control with respect to communication and other necessary procedures without the imposition on CPU 42. For the transmission of data, modem controller 34 receives data to be transmitted from CPU 42 and controls modem 32 to demodulate and transmit the data, as well as notifying CPU 42 of the information of the transmission result. For the reception of the data, modem controller 34 receives the demodulated data from modem 32 and information of the reception result to notify CPU 42.

Furthermore, the modem controller 34 turns switch SW2 off by operating relay circuit 36 for the termination of line connection when an unrecoverable error is detected. The modem controller 34 will also turn switch SW2 off when transmission/reception of all data is completed.

Talking by the attached telephone set 22 is possible when switch SW1 is on, while data communication is possible when switch SW2 is on. If switch SW1 is on during data communication, noise will be carried to the telephone line from the telephone handset, leading to the possibility of malfunction of modem 32. Therefore, it is necessary to place the telephone handset on its hook during data communication to keep switch SW1 off. All such switching operation is carried out by the operator in general.

When transmission/reception of the data is completed, or when communication error occurs, switch SW2 is turned off by modem controller 34. As described above, switch SW1 is off during communication. Consequently, as switches SW2 and SW1 are both in the off position, the line is disconnected. The line will also be disconnected when the destination station encounters a likewise state.

With the apparatus shown in FIG. 1, it is difficult for the operator to interrupt the data communication and commence talking with another station using the attached telephone set. The data communication apparatus shown in FIG. 2 is designed to deal with this problem. The difference between the data communication apparatus of FIG. 2 and that of FIG. 1 is that a switch SW3 is provided in series with switch SW1 in the connection circuit of the attached telephone set 22, and that the apparatus further includes an off hook detecting circuit 58 for detecting the off hook state of the telephone handset of the attached telephone set 22 to provide an off hook detection signal to modem controller 34 via connection line 64. Further, a relay circuit 60 is connected to modem controller 34 by connection line 62 for operating switch SW3 responsive to the operator's talking request instruction and communication commence instruction. In FIG. 2, the elements identical or corresponding to the elements in the data communication apparatus of FIG. 1 are given identical names and numbers. The functions thereof are also identical. Therefore, the detail descriptions thereof will not be repeated here.

FIG. 3 is a more detailed block diagram of a portion of FIG. 2. Referring to FIG. 3, the off hook detection circuit 58 includes a bidirectional photo coupler 66 having one input connected to switch SW3, the other connected to terminal 14, one output connected to the power potential Vc and the other connected to modem controller 34 via connection line 64, and also grounded via a resistor R. The relay circuit 60 includes a relay 68 having one end connected to the power potential Vc for disconnecting switch SW3, and a transistor 70 having the base connected to connection line 62, the emitter connected to the ground potential, and the collector connected to the other end of relay 68. In FIG. 2, the telephone set is connected to terminals 73 and 75.

Referring to FIGS. 2 and 3, the conventional data communication apparatus operates as follows. Prior to data communication, the operator lifts the telephone handset of the attached telephone. The photo coupler 66 is conductive and the potential of connection line 64 rises. The modem controller 34 will turn switch SW2 off in response to the rise of this potential.

After line connection by the attached telephone, the operator will operate the communication switching button (not shown) of modem controller 34 to send an attached telephone disconnection signal to connection line 62. The relay 68 is operative to the conduction of transistor 70 to turn switch SW3 off. Simultaneously, the modem controller 34 operates relay circuit 36 so that switch SW2 it turned on.

In accordance with the above operation, modem unit 18 is line connected with another station through line connection unit 16 to execute transmission/reception of data.

In the case the operator wants to talk with the destination station during data transmission/reception, the operator will lift the telephone handset of the attached telephone set and push a talking request button, not shown, of modem controller 34. The modem controller 34 will raise the potential of connection line 62 in response to this operation. Due to the conduction of transistor 70, relay 68 operates to turn switch SW3 on, and talking will be possible. Simultaneously, the modem controller 34 operates relay circuit 36 to turn switch SW2 off. Data communication will recommence by pressing the communication switching button again.

The communication switching button and the talking request button may be provided at the input terminal of modem controller 34. Also by allocating functions to arbitrary keys in the keyboard 44 with a program executed in CPU 42, the selected key may be notified to modem controller 34 from CPU 42.

The following problems are seen in the conventional apparatus.

The conventional data communication apparatus shown in FIG. 1 is relatively simple. However, the timing of the switching operation between talking and data communication is so difficult that the inconvenience of line disconnection often occurs. This is seen when both switches SW1 and SW2 are turned on by mistake. Also in the event when both switches SW1 and SW2 are turned on by mistake, there is the possibility of noise entering modem unit 18 from the attached telephone set to cause communication error. When such line disconnection occurs, it will be necessary to reconnect the lines. Accordingly, the operation efficiency of this conventional data communication apparatus is low.

The switching between data communication and talking with the apparatus shown in FIGS. 2 and 3 is carried out by the hardware so disconnection by operation error seldom happens. However, there is the necessity of newly providing a relay circuit 60, an off hook detecting circuit 58, etc. to the circuit for connection of the attached telephone set. For this reason, data communication apparatus will become large-sized and the cost will rise. There is also the need to discriminate the circuit for the connection of the attached telephone set from the circuit for the connection of the public telephone line, leading to difficulty in operability.

Thus, a data communication apparatus with reliable operability having a suitable balance between a simple and not expensive structure, and a structure with minimum possibility of operation error is desired.

SUMMARY OF THE INVENTION

Accordingly, an object of the present invention is to provide a data communication apparatus with simple structure and reliable operability.

Another object of the present invention is to provide a data communication apparatus that is capable to shift to talking mode by a telephone set without fault when necessary after the termination of data communication.

A still further object of the present invention is to provide a data communication apparatus that is capable to shift to talking mode by a telephone set with simple operation after the termination of data communication.

An additional object of the present invention is to provide a data communication apparatus that can shift to talking mode by a telephone set after the termination of data communication and with simple physical connection to a telephone line.

A further additional object of the present invention is to provide a data communication apparatus that is capable of shifting to talking mode by a telephone set when necessary after the termination of data communication and also capable of cancelling talking request.

The above objects may be achieved with a data communication apparatus including a data communication portion arranged to be connected to the public telephone line in parallel with the telephone set for data transmission/reception with other stations through line connection between the apparatus and other stations; a termination command generating device for generating a termination command to terminate data communication by the data communication portion under a predetermined condition; a detecting device for detecting the termination command to generate a detection signal; a delay circuit for delaying the detection signal by a predetermined time, a line connection terminating device for terminating the line connection in response to the delayed detection signal.

In accordance with the preferred embodiment of the invention, the data communication apparatus further includes a device for generating a talking request signal to request the talking with another station by the telephone set, and a termination cancelling device for cancelling the detection signal and for cancelling the line connection.

When the termination signal for terminating the data communication is generated by the termination command generating device, the detecting device detects the termination signal and generates a detection signal. The detection signal is delayed for a predetermined time and is applied to the line connection terminating device. Accordingly, there is a time margin defined by the delay circuit during the generation of the termination command and the disconnection of the telephone line. Because the timing of the operation to maintain line connection is not strictly limited, the operability of the data communication device is improved. No great modification is necessary to the existing apparatus, for each aforementioned device may be implemented with the software operable by the microcomputer. Thus, the complexity and cost increase in the apparatus can be avoided.

In the case where a device for generating a talking request signal and a termination cancelling device are provided, line disconnection is automatically canceled by generating a talking request signal. Accordingly, the shifting to talking mode from data communication by telephone may be carried out without failure.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
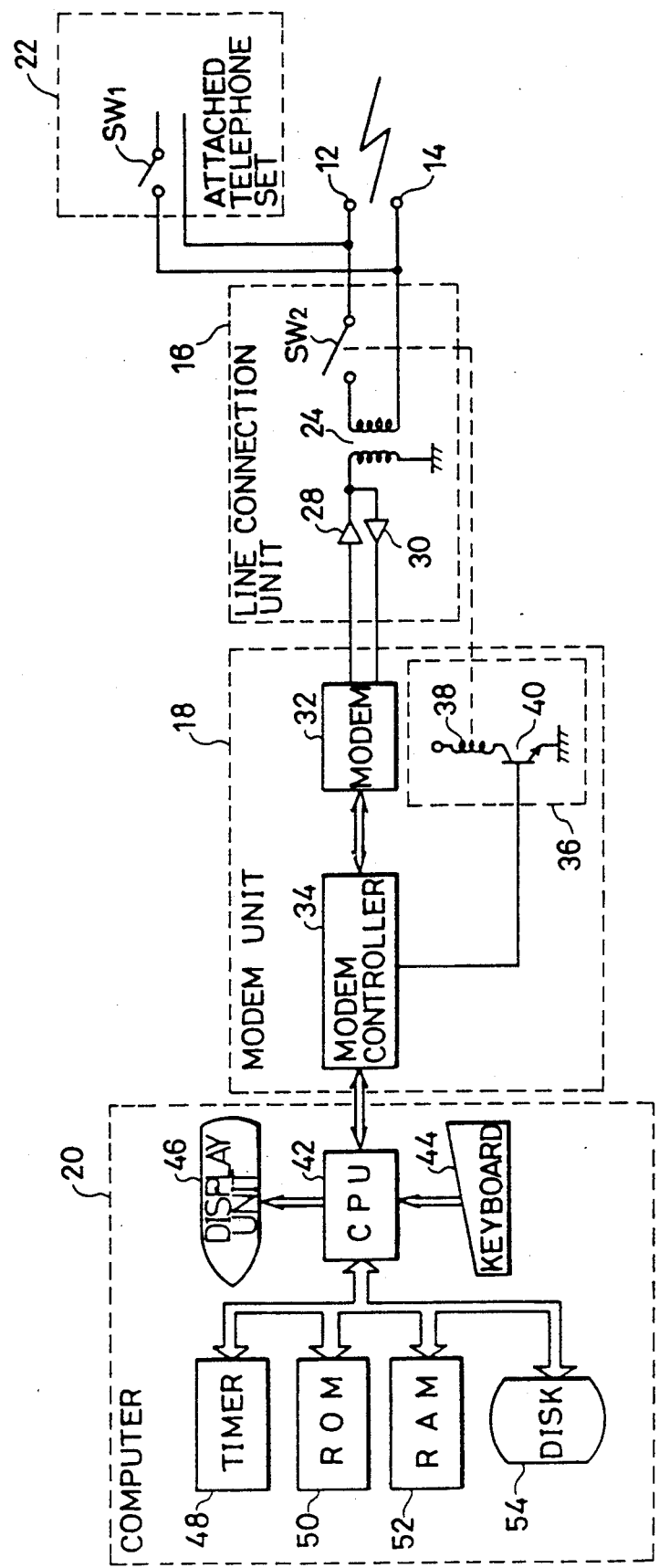
FIG. 1 is a block diagram of a conventional data communication apparatus.
Figure 2:
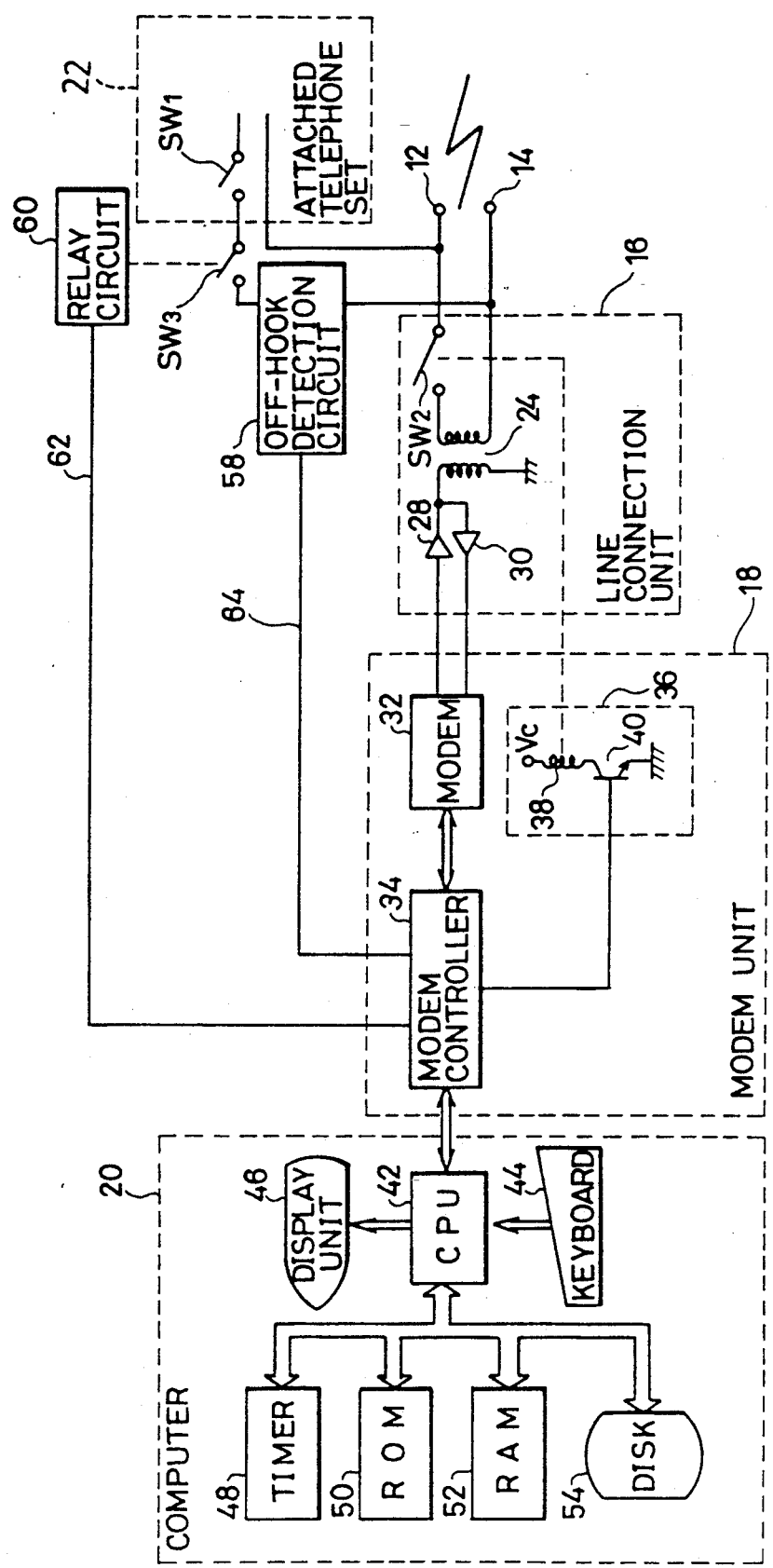
FIG. 2 is a block diagram of another conventional data communication apparatus.
Figure 4:
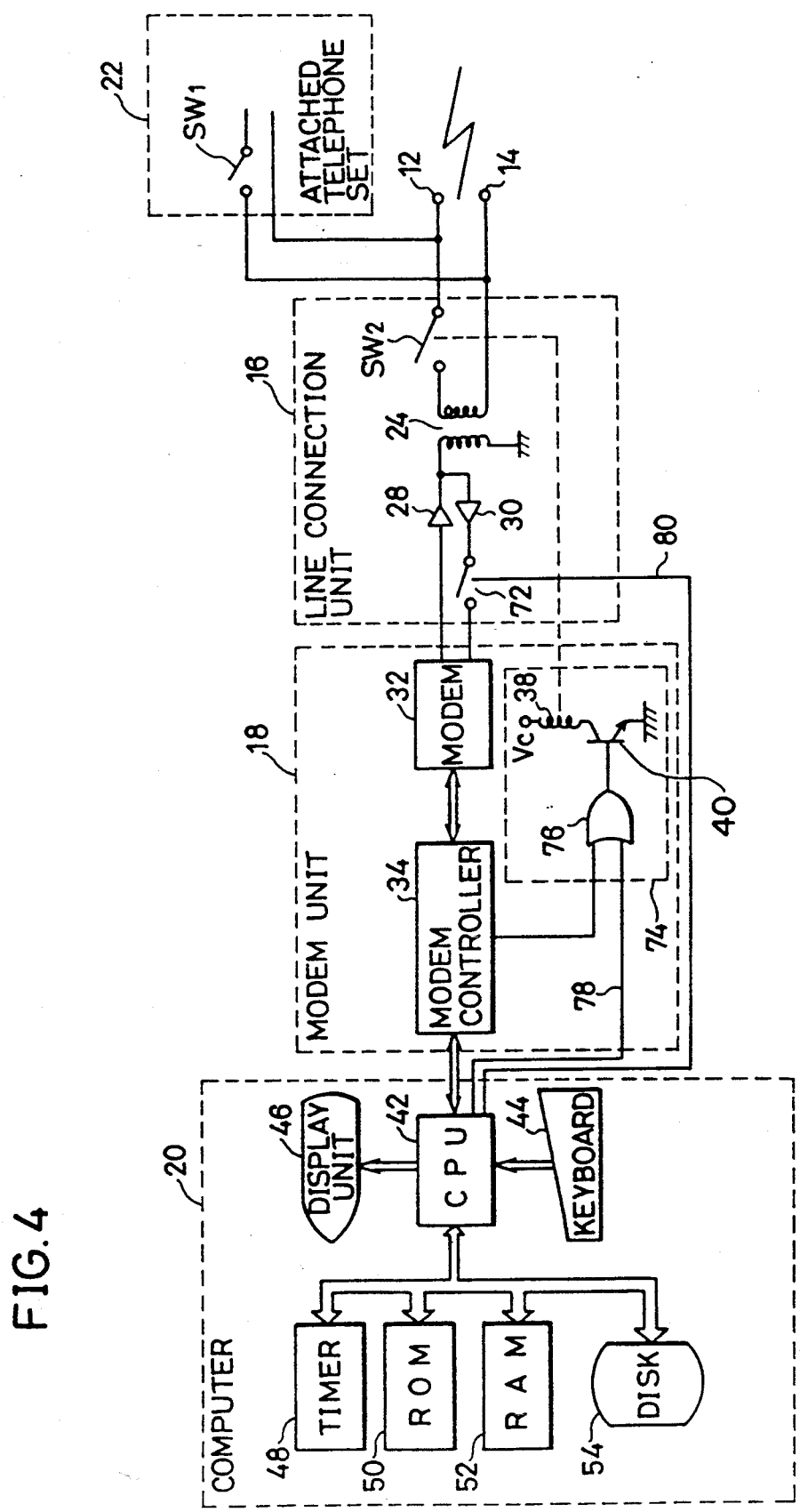
FIG. 4 is a block diagram of a data communication apparatus in accordance with the present invention.

FIG. 4 is a block diagram of a data communication apparatus in accordance with a preferred embodiment of the present invention. Referring to FIG. 4, this data communication apparatus differs from the conventional data communication apparatus of FIG. 1 in that the former includes a relay circuit 74 instead of the relay circuit 36 of FIG. 1 with a few difference in the configuration, and that an analog switch 72 is provided between a receiver amplifier 30 and a modem 32 for intercepting modem 32 from the noise of the attached telephone set 22. The data communication apparatus of FIG. 4 also has a routine provided for operating analog switch 72 and relay circuit 74 in the program operated by CPU 42.

The relay circuit 74 includes an OR circuit 76 having one input connected to modem controller 34 and the other connected to CPU 42 via an interface, not shown, and connection line 78, a relay 38 having one end connected to the power potential Vc for operating switch SW2, and a transistor 40. The base of the transistor is connected to the output of OR circuit 76, the collector is connected to the other end of relay 38, and the emitter is connected to the ground potential. A simple switching device, for example, a MOSFET (Metal-Oxide-Semiconductor Field Effect Transistor), is sufficient for analog switch 72. This switch is connected to CPU 42 by an analog switch signal line 80.

Figure 5:
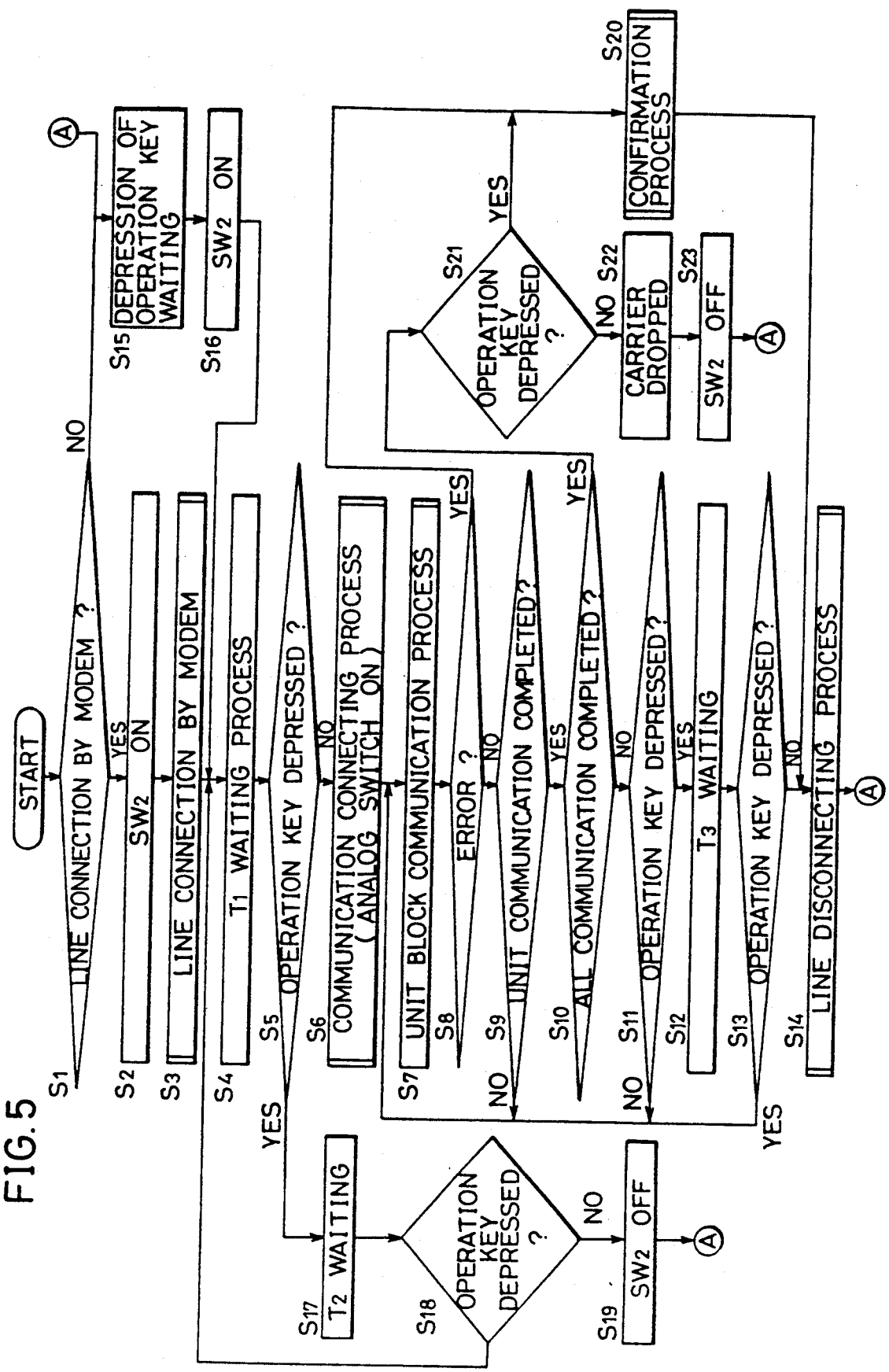
FIG. 5 is a schematic flow chart of the program executed by the computer in the apparatus of FIG. 4.
Figure 6:
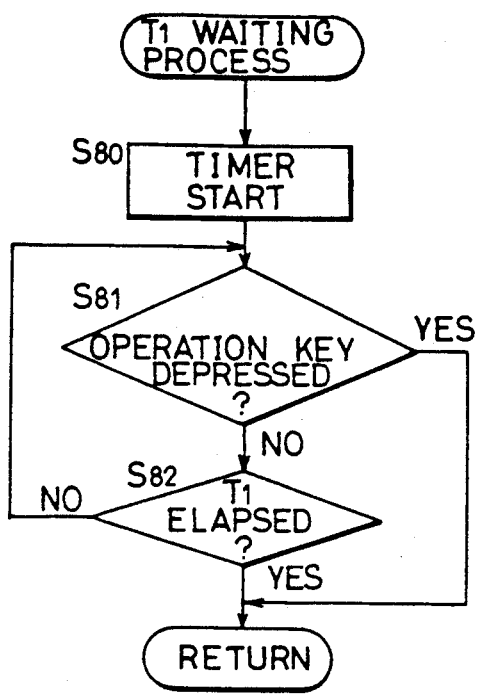
FIGS. 6–8 are detailed flow charts of portions of the flow chart in FIG. 5.
Figure 7:
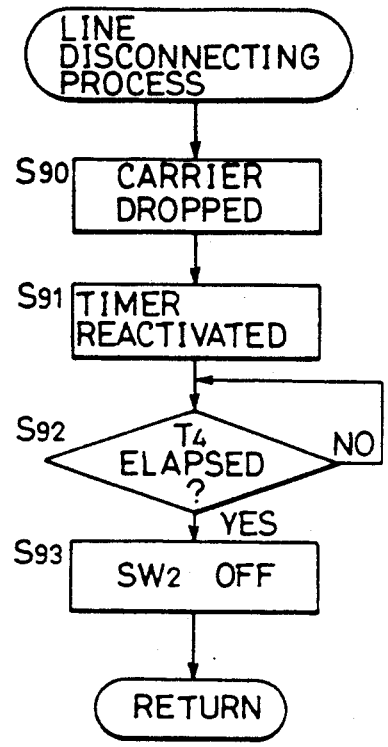
Figure 8:
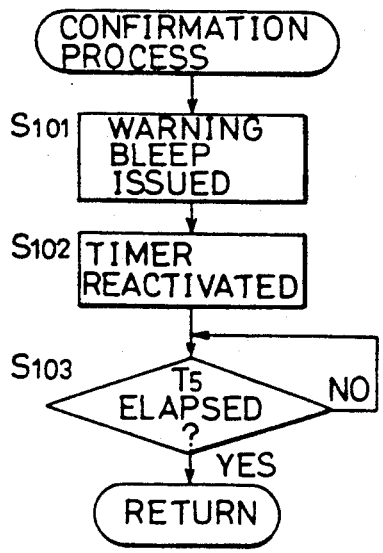

FIG. 5 is a flow chart schematically showing the program executed by CPU 42, while FIGS. 6-8 are flow charts of partial routines of the program represented in FIG. 5. Referring to FIG. 5, the control flow of this program will be described hereinafter. The operation of the data communication device of FIG. 4 will also be explained.

Upon commencing the program, the necessary initialization process is executed. Then at step S1 it is determined whether line connection by the modem is specified or not. This specification is defined at the time of the data communication apparatus being installed. The data may be written in ROM 50 or in a predetermined file in disk 54. This data may also be specified by the operator through the display 46 and the keyboard 44 at the commencement of the program. If line connection by the modem is specified, control proceeds to step S2. Otherwise, control will proceed to step S15.

At step S2, switch SW2 is turned on, to switch the modem unit to the off hook position. Referring to FIG. 4, CPU 42 transmits the signal to transistor 40 via connection line 78 and OR circuit 76 to turn transistor 40 on. This causes relay 38 to operate, and switch SW2 is on.

The control next proceeds to step S3. At step S3, a non-manual dialing operation is performed for line connection with another station. One way will be hereinafter described. The CPU 42 transmits the destination telephone number and the "dial" command to modem controller 34. The modem controller 34 operates relay circuit 74 in accordance with the transmitted telephone number to disconnect switch SW2 a plurality of times. This causes dial pulse signals to be sent to the telephone line. The exchange device, not shown, in the telephone line network is responsive to this dial pulse signal and connects the data communication apparatus with the destination station via a predetermined procedure. Naturally, if the exchange device of the station side is of the digital type, dialing by multi-frequency codes, the so-called push button method is also allowed.

The control proceeds to S4, where the depression of a predetermined key on the keyboard 44 by the operator is monitored for the duration of T1. This is to cancel the entry of the communication state if a predetermined operation key is pressed. The flow chart of the subroutine of step S4 is shown in FIG. 6.

Figure 3:
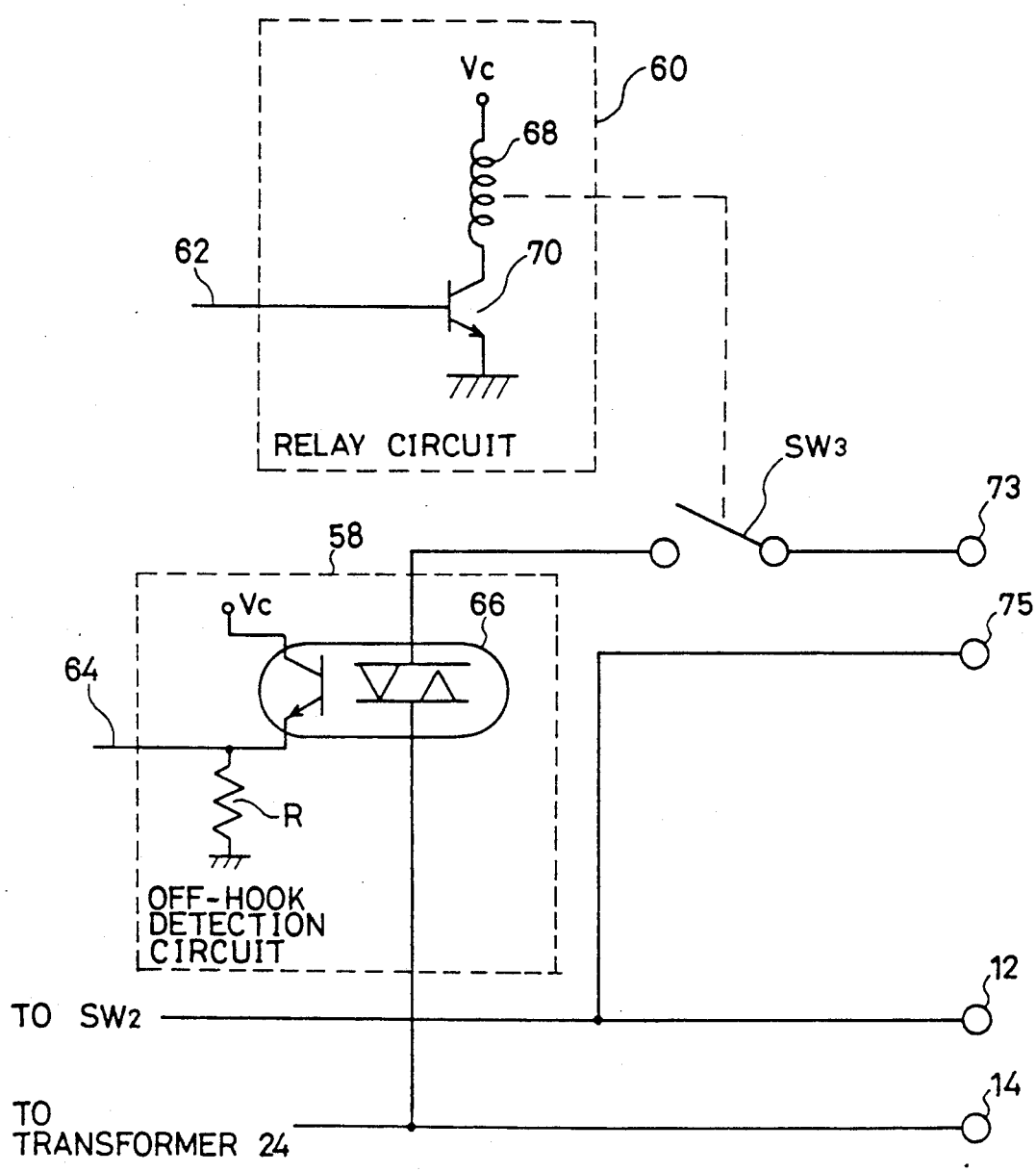
FIG. 3 is a block diagram showing the details of the block diagram of FIG. 2.

Referring to FIG. 6, in the T1 waiting process, a timer 48 is activated at step S80. Whether a predetermined key on the keyboard has been operated or not is checked at step S81. If the answer is Yes, the control returns to the main routine. If the answer is No, step S82 checks whether the duration of time T1 has elapsed or not since the commencement of the timer. If the answer is No, control returns to step S81. In the case where the process is sequenced into a subroutine as shown in FIG. 3, it is necessary to set a flag or the like with the information of the pressed key when the answer to step S81 is Yes.

At step S5, the depression of the operation key in step S4 is checked. If the answer is Yes, the control flow proceeds to step S17. If the answer is No, the control flow proceeds to step S6.

At step S17, the depression of the operation key is monitored for the duration of T2, likewise to step S4. At step S18, it is checked whether the operation key is depressed or not. If the answer is Yes, the flow will return to step S4. If the answer is No, control will proceed to step S19. At step S19, switch SW2 is turned off and the control proceeds to step S15. At step S15, the CPU 42 is in a waiting state until the operator presses the operation key.

The flow of the control to step S6 is next described. At step S6, communication connection process is performed. That is, a carrier is transmitted to the public telephone line from modem 32. Simultaneously, analog switch 72 is turned on by CPU 42. Since the waiting time at step S4 is T1, switch SW1 is turned off by the operator before analog switch 72 is turned on. Therefore, noise from the telephone handset will not enter modem 32 and the malfunction of modem 32 is avoided.

The control flow proceeds to step S7, where communication process of a unit block is performed with the destination station. Communication process of a unit block includes one packet process in packet communication, and also X control for temporarily interrupting the communication (communication break) for avoiding the overflow of the buffer memory of its own station or another station during circuit switch communication.

In the case of data transmission, the CPU 42, for example, passes one unit of data in the file within disk 54 to modem unit 18. At modem unit 18, necessary information is added to this one unit of data and converted into analog signals. This converted data is sent to line connection unit 16, where it is amplified by a transmitter amplifier 28. The amplified analog signal is transmitted to the public telephone line via line transformer 24.

In the case of data reception, the signals follow the reverse path. The only exception is that the received signal is amplified by receiver amplifier 30, instead of transmitter amplifier 28, to enter modem 32. It is needless to say that data communication should not be interrupted during the communication of one unit of data.

The control proceeds to step S8. At step S8, it is determined whether the communication in step S7 has been normally performed or not. If modem controller 34 detects some unrecoverable error that should terminate line connection, the flow proceeds to step S20. At step S20, the CPU 42 notifies the operator of an error occurrence. Then, the control proceeds to step S14 to disconnect the line after the duration of a predetermined time. In this case, the modem controller 34 functions as the termination command generating device, while steps S8 and S20 correspond to the detection means for detecting the termination command.

When there is no occurrence of an unrecoverable error, the control flow proceeds to step S9. At step S9, it is confirmed whether the communication of a predetermined unit of data has been completed or not. This is to avoid the division of the unit of data that should not fundamentally be divided and to group the transmission. If the answer to this step is No, the flow will return to step S7 and the next transmission will be carried out.

If the answer is Yes, interruption request of the communication will be allowed. The control flow proceeds to step S10. At step S10, it is determined whether the communication of all data has completed or not. If the answer is Yes, the control flow proceeds to step S21. If the answer is No, the control flow proceeds to step S11, where the depression of the operation key is checked. If the operation key is depressed, it is regarded that the operator wants to interrupt the communication and has issued the termination command. The control will proceed to step S12. In this case, data communication is interrupted but the carrier is kept transmitted. If the operation key is not depressed, the control flow will proceed to step S7 to continue the data communication. That is to say, step S11 functions as the detection device for detecting the termination command.

Steps S12 and S13 are provided as remedies in the event of the operator changing his/her mind to continue the communication after once deciding the interruption of the communication, or in the event of the operation key being depressed by mistake. At step S12, the process is brought into a waiting state for the duration of T3 where the destination station enters the talking condition. As mentioned before, the transmission of the carrier is continued. If the operation key is pressed again during the time of T3, the flow returns to step S7. In other words, the interruption of the communication is cancelled. If the operation key is not pressed during the time of T3, control proceeds to step S14.

Step S14 is a step provided for communication interruption, interrupting the communication to talk, telephone communication by the operator in case of accidental condition of the communication, and also prepared for the talking of the operator after normal termination of communication. Furthermore, it is a step for disconnecting the line after the elapse of a predetermined delay time to be able to enter the voice communication state by the attached telephone readily and without failure when necessary.

FIG. 7 is an example of the routine flow chart of the line disconnection process in step S14. Referring to FIG. 7, the flow of the routine first proceeds to step S90. At step S90, the carrier transmitted from modem 32 to the public telephone line is dropped. The analog switch 72 is simultaneously turned off. This will terminate line connection for communication. Then, the flow proceeds to step S91. Steps S91 and S92 are provided to delay the practical line disconnection and produce time margin so that the operator may turn switch SW1 on by operating the telephone handset of the attached telephone set 22.

In other words, after timer 48 is reactivated at step S91, the procedure of the flow is held in a waiting state until the duration of time T4 in step S92 elapses since the reactivation of the timer. If the operator turns switch SW1 on during this time period, line connection on the attached telephone set 22 side will be maintained even if switch SW2 is turned off, which enables talking with the destination station.

At the elapse of time T4 after the timer is reactivated, the flow proceeds to step S93 where switch SW2 is turned off. If switch SW1 is also off at this time, the circuit with the destination station will be completely disconnected. That is to say, steps S91 and S92 function as delaying devices, while step S93 functions as a line connection terminating device together with the relay circuit 74.

Steps S21–S23 are the control flows when the complete communication has terminated. At step S21, the depression of the operation key by the operator is checked. If the answer is Yes, the flow will proceed to step S14 from step S20.

In this case, the aforementioned time margin is available until the line is disconnected at step S14. Therefore the operator is capable of talking with the destination station using the attached telephone set 22 by turning switch SW1 on during this time margin.

When the depression of the operation key by the operator is not confirmed at step S21, the flow proceeds to steps S21 and S23, where the drop of the carrier and the turning off of switch SW2 is carried out immediately. This causes the line connection with the destination station to be disconnected instantly.

FIG. 8 is a detailed flow chart of step S20 for confirmation process, branching from step S8 in case communication error occurs. The control also branches to step S20 from step S21 in the case where the complete communication terminates normally and the operator requires a following communication.

Referring to FIG. 8, the flow first proceeds to step S101 in the confirmation process. At step S101, a warning beep is issued to notify the operator that communication error has occurred, or that switch SW1 is required to be turned on during a predetermined time for talking. Then timer 48 is reactivated at step S102, and the procedure of the flow is kept in a waiting state until the expiration of time T5.

The flow of the program proceeds to step S15 after each step S14, S19, and S23. At step S15, the procedure of the flow is stopped until the operation key is depressed. If the operation key is depressed at this time, the flow will proceed to step S16 to turn on switch SW2 of the modem unit. The flow will further proceed to step S4, where the aforementioned communication routine is entered. However, it is required that the connection between the attached telephone set 22 and the destination station is established manually by the operator, or line connection is maintained after the interruption of the communication, before the operation key is depressed at step S15.

In the flow chart of FIGS. 5–8, the detection of complete communication termination at step S10 is achieved by detecting the end of the data on its own station side during transmission, or by receiving a termination message from the destination station during reception. The depression of the operating key at steps S11 and S21 means that the termination command to disconnect the line is given to the data communication apparatus.

The function of modem controller 34 to detect the accidental condition in communication and to transmit the information thereof to CPU 42, or the function of the keyboard to transmit to CPU 42 the operator's intention to intervene by pressing the key corresponds to the termination command generating device. In the program executed by CPU 42, steps S8, S10, S11, and S21 correspond to the detection device of the termination command. In principle, steps S91 and S92 are delay device implemented by the program.

Steps S17 and S18, and steps S12 and S13 correspond to the cancelling of the action after the operation key is once pressed. Steps S4 and S5 correspond to the cancelling of the instruction for entering communication. These steps have the advantage to enable the cancelling of its own station operation error, as well as avoiding trouble for the destination station.

Figure 9:
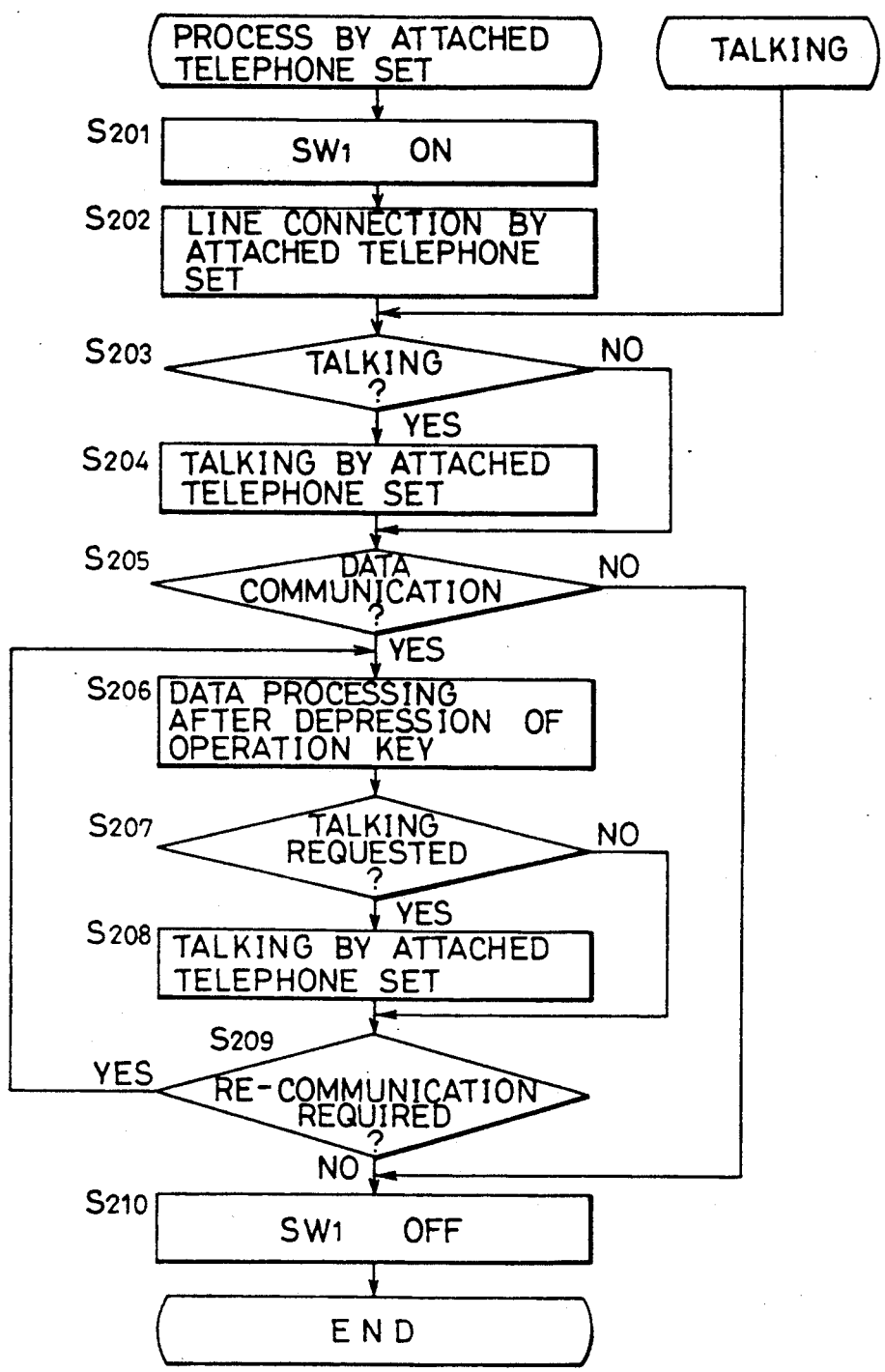
FIG. 9 is the operation flow chart of the operator showing an operating example of the data communication apparatus in accordance with the present invention.

FIG. 9 is a flow chart representing the operation of the operator. Referring to FIG. 9, an operation example of the data communication apparatus is explained. In accordance with the data communication apparatus of the invention, the operator should execute the procedures defined in the flow chart of FIG. 9 in order to perform the aforementioned communication operation. A description is given to a case where line connection is established by the exemplary attached telephone set. Before entering the operation of this flow chart, the operator should have activated the inventive data communication apparatus and set the apparatus in a state of waiting a key depression shown in step S15 of FIG. 5.

Referring to FIG. 9, the operator lifts up the handset of the attached telephone set 22 at step 201 to turn switch SW1 on. At step S202, the operator connects the line with the destination station by dialing the attached telephone. If the connection is already established, steps S201 and S202 are not required.

Next at step S203, the operator determines whether or not it is necessary to talk with the destination station. If talking is necessary, the operator proceeds to step S204 where he/she talks with the called party. If not necessary, the operator proceeds to step S205. At step S205, the operator determines whether data communication is necessary or not. If unnecessary, the operator proceeds to step S210 where he/she hangs the handset of the attached telephone set 22 to turn switch SW1 off. In short, this is the same as general talking by telephone. In this case, the switch SW2 of the modem unit is kept off and the circuit with the destination station is completely disconnected.

If the operator determines that "data communication is necessary" at step S205, the action flow of the operator proceeds to step S206. At step S206, the operator depresses the operation key. By this action, the condition of step S15 is satisfied for the data communication apparatus to commence the operation and the apparatus enters the communication connection process via steps S16, S4 and S5. That is, the data communication apparatus will carry out the data communication process in accordance with the program.

When the communication process of step S206 is terminating under some condition, or when it is necessary to be terminated, the operator will make the decision of step S207. The communication process is terminated when the communication of all the data is completed or when communication error occurs, etc. Also, the process is terminated when the operator attempts to interrupt the communication for some reason.

During the communication process of step S206 or at the time of communication process termination, the operator can turn off switch SW2 by pressing a predetermined operation key and talk with the other party by the attached telephone set 22. To be more exact, the voice communication is available when the operator turns on switch SW1 of the attached telephone set 22 within a predetermined duration after the operation key is depressed.

After step S208 when the talking is over, the communication state can be resumed if the operator depresses the operation key once more. If the telephone handset is then hung up, switch W1 will be turned off. Because switch SW2 is already off, the line will be completely disconnected.

In accordance with the embodiment, the switching between talking and data communication is performed readily by the operator following the predetermined procedures shown in FIG. 9. The only required means to be newly provided is a connection line, for example, for relay operating the switch SW2 of the modem unit by CPU 42 as well as an analog switch 72 turned on only while carrier is transmitted by the same CPU 42, and its connection line thereof. Circuits such as for detecting the off hook of the attached telephone set 22 side and for carrying out the line disconnection are not required. Consequently, the tendency towards complexity of the data communication apparatus may be avoided.

The operation keys may be provided by allocating predetermined functions to the keys of the computer keyboard by a software. This gives the present invention an advantage of being readily applicable to card modems or the like of the so-called word processors and personal computers. Furthermore, the consecutive procedures of the operator may be specified with only one predetermined key, facilitating the switching between communication and talking.

In the aforementioned embodiment, there is no need to provide a new circuit on the attached telephone set 22 side. Therefore, when the public telephone line and the attached telephone set 22 are to be connected to the data communication apparatus by modular jacks, only two standardized modular jacks are required. It is not necessary to distinguish the modular jack for the attached telephone set side from that for the public telephone line side. This will be convenient in installing the data communication apparatus, as well as eliminating misconnection.

In accordance with the described embodiment, a data communication apparatus is obtained that is capable of easy switching between communication and talking, and having a simple structure and reliable operability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data communication apparatus comprising:

data communication means, adapted to be connected, in parallel with a telephone set, to a public telephone line, for communicating data by transmission or reception, with other station through connection to the telephone line, with said another station;

termination command generating means for generating a termination command, upon being activated, to terminate said data communication by said data communication means under predetermined conditions, in other words remove the brackets;

detection means for detecting said termination command and generating a detection signal;

delay means for delaying said detection signal by a predetermined time to delay telephone line connection termination to provide a period of time to switch to audible communication, subsequent to said data communication prior to telephone line connection termination; and line connection terminating means responsive to said delayed detection signal for terminating said telephone line connection upon expiration of said predetermined time, without switching to audible communication.

2. The data communication apparatus according to claim 1, further comprising:

means, when initially activated, for generating a talking request signal to allow switching to audible communication with said another station by said telephone set, termination cancelling means responsive to said talking request signal, for cancelling said delayed detection signal to cancel the termination of, and thereby maintain, said telephone line connection for subsequent audible communication.

3. The apparatus according to claim 2, further comprising switching means, responsive to said talking request signal, for electrically disconnecting said data communication means from said telephone line, and for electrically connecting said telephone set to telephone said line.

4. The apparatus according to claim 2, further comprising talking request cancelling means for cancelling said talking request signal.

5. The data communication apparatus according to claim 4, wherein
said means for generating said talking request signal is capable of generating a plurality of signals, including said talking request signal,
said plurality of signals include a first signal and a second signal, following said first signal, upon subsequent activation of said means for generating a talking request signal, and
said talking request cancelling means, responsive to generation of said second signal, cancels said first signal.

6. The apparatus according to claim 5, wherein said termination command generating means comprises means responsive to said second signal, for generating said termination command.

7. The data communication apparatus according to claim 1, further comprising notifying means responsive to said termination command for notifying the termination of said telephone line connection.

8. The data communication apparatus of claim 1 further comprising:
manual dialing means, on said telephone set, for allowing manual dialing by an operator lifting said telephone set, to subsequently connect one station, including said data communication means, to said another station; and
second delay means, for delaying data communication for a predetermined time period, to allow the operator to reset the telephone set in its original position occupied prior to being lifted, to prevent noise from the telephone set interfering with subsequent data communication.

* * * * *